United States Patent [19]
Ernst et al.

[11] 3,890,762
[45] June 24, 1975

[54] PRODUCE SHIPPING CONTAINER AND PACKING METHOD

[75] Inventors: G. Fred Ernst; William P. Faulkner, both of Lexington, Ky.

[73] Assignee: Day Star Corporation, Lexington, Ky.

[22] Filed: Aug. 20, 1973

[21] Appl. No.: 389,723

[52] U.S. Cl. .................................. 53/25; 229/14 C
[51] Int. Cl. ...... B65b 55/14; B65d 5/40; B65d 5/62
[58] Field of Search....... 229/14 R, 14 C, 37; 62/60; 217/53; 53/25; 206/516, 523, 524

[56] References Cited
UNITED STATES PATENTS

| | | | |
|---|---|---|---|
| 2,786,342 | 3/1957 | Goetz | 62/60 |
| 3,344,973 | 12/1966 | Studen | 229/37 |
| 3,516,218 | 6/1970 | Eisler | 53/25 |

FOREIGN PATENTS OR APPLICATIONS

| | | | |
|---|---|---|---|
| 1,191,499 | 10/1959 | France | 229/14 C |

Primary Examiner—Leonard D. Christian
Attorney, Agent, or Firm—Wood, Herron & Evans

[57] ABSTRACT

Surprisingly good preservation of agricultural produce is obtained by packing the product in an insulative container having a corrugated cardboard outer shell and an interior liner that is formed from separate flat panels of polystyrene foam of specified characteristics.

10 Claims, 3 Drawing Figures

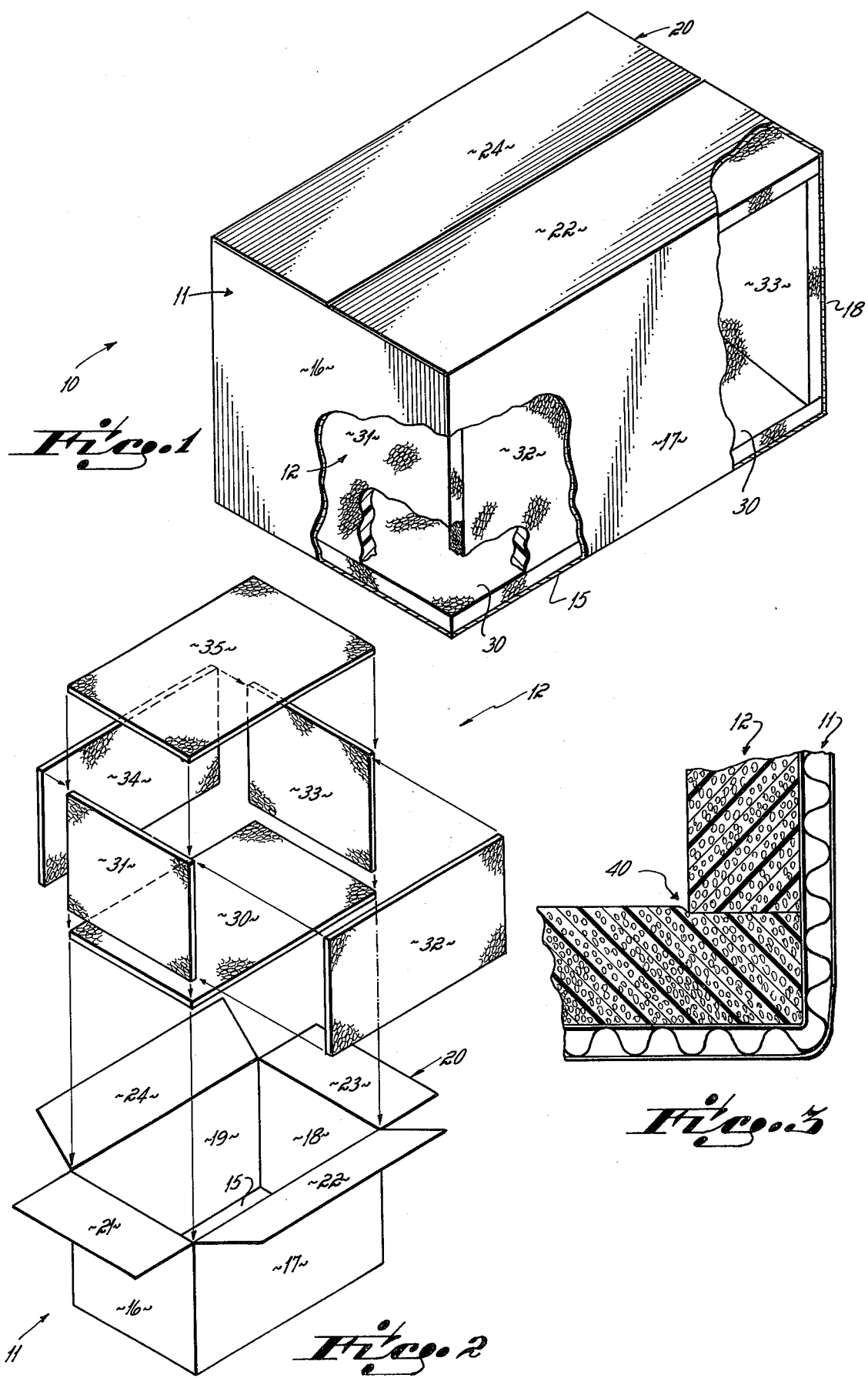

PRODUCE SHIPPING CONTAINER AND PACKING METHOD

This invention relates to an insulating container and packing method for fruits, vegetables, poultry and other types of agricultural produce.

The practical stability of any procedure for packing produce depends largely upon two factors: how well the produce is protected and its quality preserved in transit and until use, and the cost of such packing. For example, a container which provides excellent protection of fruit packed in it may be ruled out by reason of cost; conversely, many types of containers which are low in cost are nonetheless unacceptable for quality produce because they do not provide the requisite level of protection and/or preservation of that produce. Thus, the conventional corrugated cardboard box has obvious economic advantages, but its thermal insulating quality and its general ability to maintain a low spoilage level of produce are relatively poor, with the result that such containers are unacceptable or marginal for many shipment purposes.

On the other hand, good protection of produce can be obtained by use of molded polystyrene foam containers. However, such containers are relatively expensive, the foam molding procedure being relatively slow and laborious and the product bulky.

Madden Pat. No. 3,576,596, assigned to the assignee of this application, teaches a shipping container comprising a cardboard box and cover, within which is placed a molded foam plastic case to which its own foam cover is fitted in an air-tight manner. In practice, the foam case shown in that patent is a one-piece or unitary molding, in order to provide the airtightness which it is the objective of that patent to provide, and in order to form a close fit between the foam cover and the foam case.

In Armato Pat. No. 2,927,712, a cooler unit is shown wherein an outer metallic casing is provided interiorly with a heat insulating shell made of a polystyrene foam having a density in the range from 2.25 to 6.00 pounds per cubic foot. The shell is unitary and is formed by molding or extrusion.

In Pat. No. 3,229,814 there is shown an outer container in which is placed a stack of produce trays, each tray made of a sandwich material comprising a cut sheet of expanded polystyrene integrally bonded to a plastic film for toughness.

Pat. No. 3,327,882 shows a shipping container defined by molded interlocking plastic foam panels which are especially treated to provide a tough skin on them. The panels fit together by means of tongue and groove legs and are held in assembled relation by encircling straps.

Studen Pat. No. 3,344,973 shows a lined container for delicate goods such as printed circuits, wherein a box blank is formed of a composite laminate material comprising corrugated board with a resin foam cemented directly to the corrugated board. The composite is cut and creased so that both the cardboard and foam bend along predetermined lines for fabricating to box form.

The foregoing prior art constructions are subject to the overriding practical defect of being relatively expensive, because molded elements and special sandwich assemblies tend to push costs beyond an acceptable limit. In this connection, it must be borne in mind that produce containers are usually used only for a single shipment, it being economically prohibitive, and/or legally prohibited, to reuse them for subsequent shipments.

This invention is directed to a container shipment and method which affords a low cost factor that has heretofore not been available in a foam container, in combination with surprisingly good protective qualities and ability to be cooled rapidly. This container can be manufactured at substantially lower cost than the molded polystyrene containers and coolers of the past.

In accordance with the invention, a polystyrene foam is prepared as a block or slab having a density of 0.5–1.5 pounds/cubic foot. Flat sheets of polystyrene are cut from the foam block and preferably have a thickness of one-quarter to 1½ inches. (The term "cut" refers to a flat panel shaping process wherein the large surfaces of the panels are cut by a hot wire or by sawing or other cutting techniques, in contradistinction to surfaces which are defined by extrusion or molding). These flat sheets are cut into separate smaller panels that are respectively sized to line the inside surfaces of a cardboard box which forms the outer shell of the container. The liner panels are cut to fit against the bottom, sides, and under the top of the cardboard box. The panels are sized so as to abut and fit snugly against one another along their edges at the edges of the box, thereby to support one another in engagement with the inside surfaces of the box to define an internal packing space.

Produce, which term is used boardly herein to include lettuce, celery, tomatoes, apples, citrus fruit, poultry, meat and the like without limitation, is placed within the packing space so defined. Internal spacing partitions and separators may be provided if appropriate. A polystyrene foam cover panel, cut to fit just inside of and against the box cover, is set in place, resting on the top edges of the foam panels around the sides of the box. The top of the box is then closed. The container thus filled may then be cooled and shipped.

This construction and method meets both of the previously specified criteria for shipping containers. As shown hereinafter, it provides remarkably good storage characteristics, generally equal to those of the container described in the Madden patent and far superior to those of a conventional cardboard box. Since the polystyrene panels are cut from foam blocks, they can be produced far more rapidly and at far less expense than extruded or molded panels. Elimination of gluing or any other step for fastening the foam panels in the box also contributes to low cost.

As is well known to those skilled in the art, foam polystyrene can be produced in large blocks or slabs from discrete particles or beads which contain an expanding agent. According to the usual procedure, the beads are subjected to a "pre-expansion" step in which they are heated, as by steam, which causes them to expand but not to cohere to one another, see for example Cunningham Pat. No. 3,227,424. After aging, the expanded beads are then placed into a chamber and further expanded and cohered to form an integral block. The density or weight per unit volume of the final product is controlled by the time and temperature of the two expansion steps, and it is possible to obtain foams having a wide range of densities, up to 3.5 lbs./cubic foot or more.

The invention is further described by reference to the accompanying drawing which shows an insulative shipping carton in accordance with a preferred embodiment of the invention.

In the drawing:

FIG. 1 is a perspective view of a cardboard box partly broken away to show the liner as formed of separate cut panels of foam plastic, FIG. 2 is an exploded perspective view of the container shown in FIG. 1, showing the manner in which the liner panels are inserted into the cardboard outer shell, and FIG. 3 is an enlarged fragmentary view showing the edgewise engagement of one foam panel with an adjacent panel in the box, whereby they are in mutually supporting relation and in facial engagement with the inside surface of the box.

In FIG. 1, the shipping container designated generally by 10 comprises two main components, an outer shell which is in the form of a rectangular cardboard box 11 and a liner, generally at 12, inside of box 11.

Box 11 may be generally conventional in form, and is preferably fabricated from approximately 200 lb. test 3 ply corrugated cardboard. It should be noted that in the past it has been conventional to use a heavier weight of board, e.g. 250 to 275 lb. test board, for shipping containers, and that the 200 lb. weight would generally be considered undesirably light for such purpose. However, when a liner is provided in accordance with this invention, the liner provides some of the stiffness or rigidity that otherwise would have to be provided by the cardboard alone, thereby enabling a lighter weight board to be used for the box.

Box 11 includes a bottom wall 15 and sidewalls 16, 17, 18 and 19. The top 20 of the box in preferred embodiment is formed by four flaps 21, 22, 23 and 24, which are hingedly connected to sidewalls 16, 17, 18 and 19 respectively. The box may be sealed by stapling or taping the outer flaps 22 and 24 in the position shown in FIG. 1. (Although the top 20 shown in the preferred embodiment is integral with the sidewalls, it should be understood that a separate top or slip cover may be used within the scope of the invention). Those skilled in the art will recognize that the general technique of forming such boxes is well known.

The box liner is comprised of six foam panels, which are fitted separately inside the box. These panels are all made of foam plastic, polystyrene, preferably and include a bottom panel 30, four side panels 31, 32, 33 and 34, and a top panel 35. The panels 30–35 respectively reside in facial engagement with the inner surfaces of the box bottom 15, the box sidewalls 16, 17, 18 and 19 and the box top 20.

It is an advantage of the invention that the panels comprise separate flat slabs, and they need not be secured adhesively over their surfaces to the inside of the cardboard box. It is preferred that the panels are so sized that, as installed in the box 11, each panel at its edge is pressed lightly against the panels which it abuts, so that slight edge deformation and compression of the two abutting panel edges occurs as designated at 40 in FIG. 3, whereby the panels are held in position adjacent the inside respective surfaces of the box. This enables the side panels 31–34 to remain in place when the container is empty.

The carton is easily assembled. The cardboard box blank is erected to form the outer shell or box, leaving the top thereof open, and the bottom foam panel 30 is first inserted into the box, as shown in FIG. 2. In the embodiment shown, the two larger side panels 32 and 34 extend the full interior length of box 11, and the two side panels 31 and 33 extend between the opposite faces of panels 32 and 34. The panels 31 and 32 are thus inserted after panels 32 and 34, and between them, and hold the latter against the sides of the box. The box is then filled. Interior partitions or spacing means, for example as shown in the Madden patent previously identified, may be used if desired. A top foam cover panel 35 is put in place, and the box top 20 is applied and closed.

It is essential to the invention that the foam panels be cut rather than molded or extruded, and that they have a density in the range of 0.5 to 1.5 pounds per cubic foot. Preferably the density should be about 1.0 pounds per cubic foot. The panels are cut by the hot wire cutting technique, or by a knife, or may be sawed from a larger block of polystyrene, in manner known per se. The panels, cut for example from a block which may be 16 inches × 4 inches × 20 inches in size, do not have an outer skin in contrast to molded or extruded panels, and in contrast to the outer surface of the block from which they are cut. The absence of this skin is an important factor as shown hereinafter.

An important advantage of these containers is the relative rapidity with which they can be cooled, even when filled with produce and after the foam top panel has been put in place and the outer cover has been closed. Cooling time is of the essence in many modern packing plants, since cooling facilities are usually of limited small capacity.

A molded polystyrene container, in a cardboard outer shell and generally as described in the previously identified Madden patent, was packed with lettuce at a field temperature of 87°F., cured, and placed in a cool room with a mean temperature of 35°F. In 6½ hours its interior temperature had dropped only to 76°F. In contrast, when similar lettuce was placed in the container of this invention and cooled under the same conditions, temperature dropped to 57°F. in the same period. This more rapid cooling is a significant economic advantage.

In the so-called "hydro-cooling" or vacuum cooling process the packed, closed, containers travel on a conveyor through a cold zone at reduced pressure. This generally speeds up the chilling process. In a test in one such facility, a prior art container of the type shown in the Madden patent, filled with lettuce, required 1 hour 42 minutes to cool to the desired temperature of 34°F; in contrast, the present containers, also filled with lettuce and closed, chilled to 34°F. in 18 minutes. It is theorized that the outer skin on the molded prior art container restricts their cooling rate. For that purpose, it has sometimes been necessary to cut or mold holes through the foam. The containers, when cooled, are shipped in a refrigerated vehicle. Use of panels of foam having a density greater than 1.5 does not provide the advantage of the invention. The effect of foam density on cooling rate is shown by the following comparison: a cardboard container was lined with panels of polystyrene foam, hot-wire cut, of 1.6–1.7 lb./cu. ft. density. The container, when closed, chilled from 87°F. to only 74°F. in 6½ hours, whereas a similar container, but with panels made of foam of 1.5 lb. density, chilled to 57°F. in the same period, and in a vacuum cooler chilled to 34°F. in 18–20 minutes.

The produce preservation qualities of these containers are as good or better than those of molded polystyrene containers. In one test, lettuce stored in the present containers, unrefrigerated and at a temperature of 82°F. was still salable after 10 days, but lettuce stored in a unitary molded polystyrene container (at same temperature) was unsalable.

In another test, lettuce at a field temperature of 110°F., held without refrigeration in the present container for 4 days, was in substantially better condition (approximated to be 10–15% better) than lettuce held in a molded foam polystyrene container for a similar length of time and at the same ambient storage conditions.

Under refrigeration, lettuce stored in the present containers for 45 days at 35°F. displayed little deterioration, whereas lettuce stored in a unitary molded container at the same temperature for the same period was in such poor condition as to be unsalable. Again, this is believed to result from the fact that the molded foam container had a skin that restricted "breathability", or transmission of gasses principally $CO_2$, that accompany aging of produce.

The invention has been described herein with reference to use of a corrugated cardboard box as the outer shell. Corrugated board is at present the best material for that purpose, by reason of its permeability, strength, ease of folding and cost. However, it is contemplated that other gas permeable sheet materials can be used, including perforated or apertured plastic sheeting.

What is claimed is:

1. A method of packing produce for shipment comprising,
    preparing a slab of polystyrene foam having a density of 0.5–1.5 lbs./cu. ft.,
    cutting flat sheets of polystyrene from said slab,
    cutting said sheets into panels fittable in facial proximity against the respective inside surfaces of a box, said box made of air permeable sheet material having a bottom wall, side walls, and a top,
    placing so cut bottom and side panels within said box against the bottom wall and side walls thereof to form a liner therefor,
    said panels being sized to fit snugly against one another at the edges of the box thereby to support one another against the inside surfaces of the box to define a packing space within said liner,
    packing produce within said packing space,
    placing a cover panel over the top of said space, the cover panel residing on top edges of the side panels so as to reside adjacent the inside surface of the top of the box,
    closing the top of the box,
    and cooling the closed, packed container to shipment temperature.

2. The method of claim 1 wherein the closed, packed container is cooled in a vacuum cooler.

3. The method of claim 1 wherein said flat sheets are cut from said slab by the hot-wire cutting technique.

4. The method of claim 1 wherein said panels are sized so that a slight deformation of the foam occurs along the edges of the panels when placed in said box.

5. An insulative container for produce comprising,
    a rectangular, air permeable box having a bottom wall, side walls, and a top which is cooperable with the side walls to form a closure of the box,
    and a foam plastic liner within said box, said liner comprising removable flat bottom, side and cover panels which respectively are in facial engagement with but unsecured to the inside surfaces of the bottom wall, side walls and top of said box,
    the said panels abutting one another along their edges, said panels being sized so that deformation of the foam occurs along the edges of the panels where they abut one another, the box positioning and holding said panels in the described relation so that the latter define a hollow rectangular produce volume within the box,
    the said panels being separate elements and cut from plastic foam having a density in the range of 0.5 to 1.5 lbs./cu. ft.

6. The container of claim 5 wherein said box is made of corrugated board.

7. The container of claim 6 wherein said cardboard is 200 lb. test board.

8. The container of claim 6 wherein said foam is a polystyrene foam.

9. The container of claim 8 wherein said foam has a density of 1.0 lbs./cu. ft.

10. The container of claim 5 wherein said top of said box is formed from flaps which are hingedly attached to the side walls.

* * * * *